United States Patent [19]

Seireg

[11] Patent Number: 4,615,639
[45] Date of Patent: Oct. 7, 1986

[54] KEY AND KEY JOINT

[75] Inventor: Ali Seireg, Madison, Wis.

[73] Assignee: The Falk Corporation, Milwaukee, Wis.

[21] Appl. No.: 674,425

[22] Filed: Nov. 23, 1984

[51] Int. Cl.$^4$ ................................................ F16D 1/08
[52] U.S. Cl. .................................................... 403/356
[58] Field of Search ............... 403/356, 355, 357, 358, 403/318, 319

[56] References Cited

U.S. PATENT DOCUMENTS

| | | | |
|---|---|---|---|
| 1,323,172 | 11/1919 | Dover | 403/358 |
| 1,734,188 | 11/1929 | Wilson | 403/356 |
| 2,041,123 | 5/1936 | Foppl | 287/52 |
| 3,378,285 | 4/1968 | Staley | 403/358 |
| 3,679,246 | 7/1972 | Bloomquist et al. | 403/356 |
| 3,920,343 | 11/1975 | Blue et al. | 403/356 |

FOREIGN PATENT DOCUMENTS 1280509 7/1972 United Kingdom ................ 403/356

OTHER PUBLICATIONS

Barnard et al, "Bifurcated Hub Key", IBM Technical Disclosure Bulletin, vol. 22, No. 1, 6/1979.
Standard Product Catalog, The Falk Corporation, Milwaukee, Wisconsin, 1982, pp. 544-545.

Primary Examiner—Cornelius J. Husar
Assistant Examiner—Peter M. Cuomo
Attorney, Agent, or Firm—Quarles & Brady

[57] ABSTRACT

An improved key and key joint are disclosed. The key has a generally solid central portion and a pair of end portions. Each end portion is coterminus with the central portion and has a pair of spaced-apart longitudinal prongs. The inside surface of each prong is substantially parallel to the inside surface of the other prong and both inside surfaces are substantially planar. The key is assembled in the key joint with the slots defined by the longitudinal prongs extending from top to bottom through the key in a radial direction. A key joint thus assembled reduces the stress concentration factor attributable to a key joint assembled with a standard key to provide for a gradual transition between the strain of a shaft and the strain of a hub in torsion.

8 Claims, 5 Drawing Figures

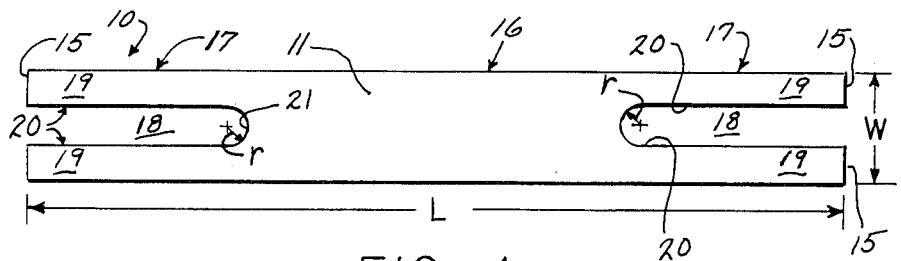
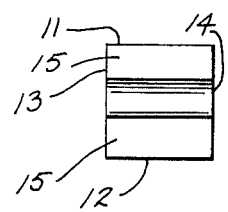
FIG. 1
FIG. 2
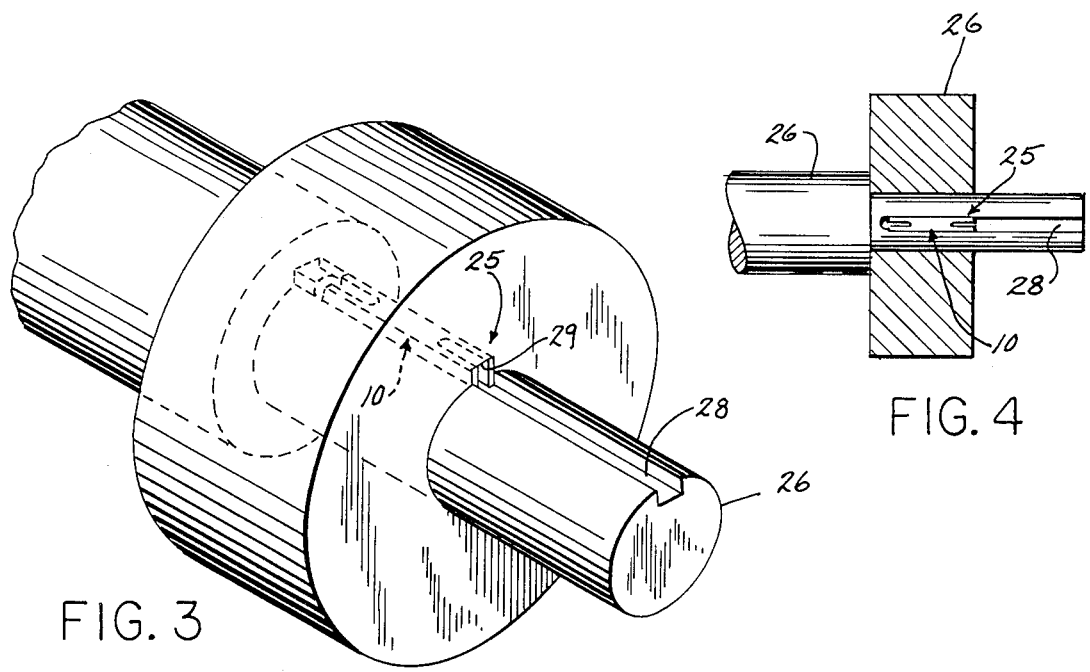
FIG. 3
FIG. 4
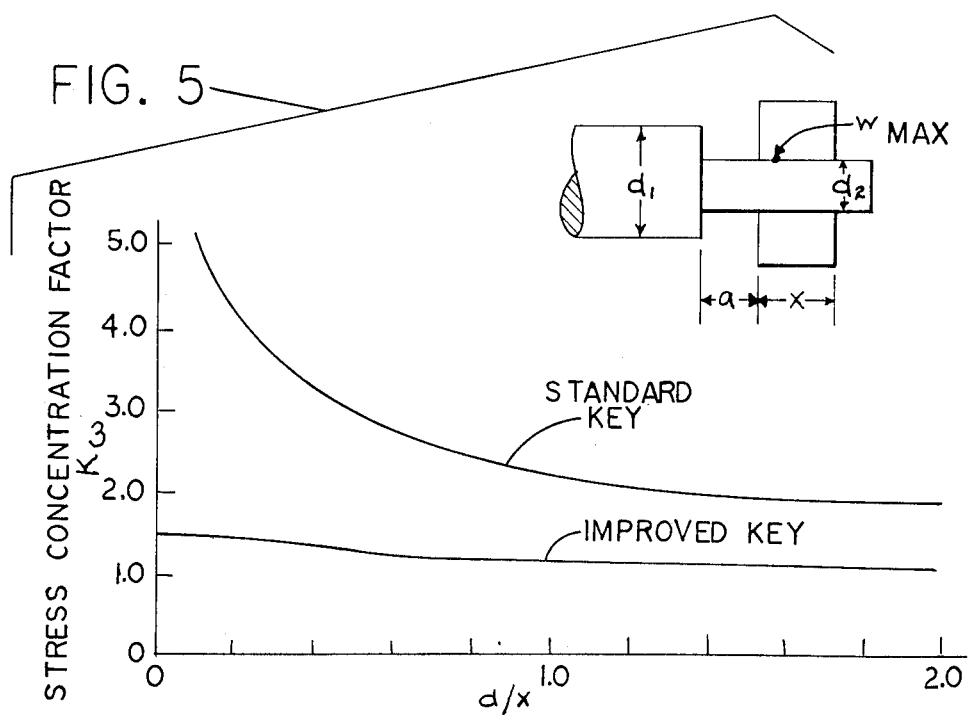
FIG. 5

KEY AND KEY JOINT

BACKGROUND OF THE INVENTION

This invention relates to torque transmitting couplings and in particular to an improved key and a key joint.

Keys and key joints for transmitting a torque between a shaft and a hub are well known. A standard key is usually solid and is of a rectangular parallelepiped shape. A key joint incorporates the key between a shaft and a hub with a portion of the key in a keyway in the shaft and the other portion in a keyway in the hub. When a torque is applied to either the shaft or the hub, the shaft and the hub undergo different amounts of elastic deformation. At the key joint however, the key tends to equalize the strains in the shaft and in the hub. This causes a high stress, or stress concentration, in the shaft and hub at the key joint and especially at the ends of the key where the different strains merge into one another. Errors in assembling the key joint can further aggravate the stress concentration problem.

Some prior art keys are designed to ease the transition between the different strains of the shaft and the hub at the ends of the key. One such key is that disclosed in Foppl U.S. Pat. No. 2,041,123 issued May 19, 1936 in which a key is disclosed having tear drop shaped bores adjacent to arcuately shaped ends. Blue et al U.S. Pat. No. 3,920,343 discloses another key having arcuate ends which are centrally bored from top to bottom.

A problem with the prior art keys having modified ends is that they are difficult and expensive to manufacture. Standard keys are usually manufactured simply by being cut and deburred from standard bar stock. The prior art keys having modified ends would require at least two operations in addition to cutting and deburring. The Foppl design would require the ends of the key to be formed, presumably by grinding, into an arcuate shape and then it would require a sophisticated machining process to form the tear drop shaped bores. The Blue et al design would also require the ends of the keys to be made arcuate and then would require a boring operation for each end. Therefore, a need exists for a key which minimizes stress concentrations at the key joint and is easy and inexpensive to manufacture.

SUMMARY OF THE INVENTION

The invention provides an improved key and key joint which provides for a gradual transition between the strain of a shaft and the strain of a hub in torsion. The key has a central portion and a pair of end portions. Each end portion is coterminus with the central portion and has a pair of spaced-apart longitudinal prongs. The inside surface of each prong is substantially parallel to the inside surface of the other prong and both inside surfaces are substantially planar.

A key joint of the invention utilizes a key of the invention. The key is assembled in the key joint with the slots defined by the longitudinal prongs extending from top to bottom through the key in a radial direction. A key joint thus assembled dramatically reduces the stress concentration factor attributable to a key joint assembled with a standard key.

A key of the present invention can be easily and inexpensively manufactured. It can be made from standard bar stock and requires only one simple machining operation other than cutting and deburring.

A key and a key joint of the invention also advantageously compensates for errors in assembly which aggravate stress concentrations. The flat and flexible ends of the key operate to spread otherwise concentrated forces over a larger area to help eliminate pressure points due to assembly errors.

Therefore, it is a principal object of the present invention to provide an improved key which minimizes stress concentrations attributable to the transmission of torque by a key joint.

It is another object of the invention to provide an improved key that can be manufactured easily and inexpensively.

It is yet another object of the invention to provide a key and a key joint which help compensate for errors in assembly.

These and other objects and advantages will become apparent from the description below. In the description, reference is made to the drawings which illustrate a preferred embodiment of the invention.

BRIEF DESCRIPTION OF THE DRAWINGS

FIG. 1 is a top plan view of a key of the present invention;

FIG. 2 is an end plan view of the key of FIG. 1;

FIG. 3 is a perspective view of a key joint incorporating the key of FIG. 1;

FIG. 4 is an elevational view partially in section of the key joint of FIG. 3; and FIG. 5 is a graph comparing the stress concentration factor for a key of the present invention to that for a standard key.

DETAILED DESCRIPTION OF THE PREFERRED EMBODIMENTS

Referring to FIGS. 1 and 2, a key 10 of the present invention is shown. It has top 11, bottom 12, left side 13, right side 14 and end 15 outer surfaces which generally define a rectangular parallelepiped which is longer than it is wide or tall. It is preferably made of a carbon steel but could be made of other suitable materials. While the key 10 of FIGS. 1 and 2 is shown as having a square rectangular transverse cross section, it could be any of a number of shapes including tall and narrow or short and wide or even circular.

The key 10 has a central portion 16 and two end portions 17. The central portion 16 is generally solid and is coterminus with the end portions 17. The end portions 17 are mirror images of one another so that a description of one end portion applies to both end portions.

The end surfaces 15 of the key 10 are preferably flat. As the length L of the key 10 is sheared from raw bar stock of the desired transverse dimensions in a conventional shearing process, the key 10 will have substantially flat ends 15 which meet with the top 11, bottom 12, left 13 and right 14 sides of the key at substantially right angles. Any contour on the ends 15 would require an additional shaping process or more complicated tooling for shearing the key from the bar stock. One important advantage of the invention, as will be seen below, is that the ends 15 can be left flat and the key 10 will still function effectively to reduce stress concentrations attributable to standard key joints. Therefore, though the ends 15 need not be flat, they are preferably left flat because of the ease in manufacturing and cost savings associated with flat-ended keys.

A longitudinal slot 18 is formed in each end portion 17 of the key so that each end portion is divided into two prongs 19. Each slot 18 extends through the key 10 from top to bottom and has straight parallel sides 20 which extend inwardly from, and at substantially right angles to, the adjacent end 15. A radius 21 at the inner end of the slot 18 joins the sides 20. The sides 20 of the slot 18 could be joined by any of a number of other shapes. However, since the radius 21 not only relieves stress concentrations within the key but is also easily formed by conventional machining, it is shown in the preferred embodiment.

The slot 18 can be formed in the key 10 by a milling operation. While milling is not the only suitable means for forming the slot 18, it is probably the easiest and least expensive to implement. The straight parallel sides 20 of the slot are especially suited to be milled and milling has the added advantage that the termination of the cutting operation leaves the radius, which, as mentioned above, serves as a stress reliever within the key.

FIGS. 3 and 4 show the key 10 assembled in a key joint 25. The key joint 25 couples a shaft 26 to a hub 27. The nature of the shaft 26 and the hub 27 are not critical to the invention. Generally the shaft and hub will be made of steel or a material which is comparable in strength to the key 10. The hub 27 may be that of a gear or pulley and the shaft may either drive the hub or be driven by the hub. While a dual diameter shaft is shown, it is not necessary to practicing the invention.

The key joint 25 includes a shaft keyway 28, a corresponding hub keyway 29 and the key 10. The key 10 is disposed within and between the keyways 28 and 29 with the slot 18 extending from top to bottom in a radial direction. The keyways 28 and 29 can be any of a number of well known shapes, the shaft keyway 28 shown being of a milled end type and the hub keyway 29 extending all the way through the hub so that it is suitable to be formed with a broach. The key 10 is fitted to the keyways 28 and 29 in a manner which is also well known in the art. Generally, the key is fitted to the keyways with a close sliding fit in smaller shafts and hubs and a set screw or other means is provided to hold the key in place. Larger parts enable a press fit so that no set screw or other means need be provided to hold the key in place.

For a key of length L and width W, it has been found that a slot 18 in which the sides 19 are spaced apart by about one third of the width of the key and are about as long as one quarter of the length of the key produces very good results. Since the sides 20 are about one quarter of the length of the key 10, the maximum length of the slot 18 is about one quarter of the length of the key 10 plus the radius r of radius 21, the radius being equal to one half of the distance between the sides 20, or one sixth of the width of the key 10. Therefore, the maximum length of the slot 18 is preferably about one quarter of the length of the key plus one sixth of the width of the key. The slot 18 is also preferably centered between the sides 16 and 17 so that the width of each prong 19 is approximately equal to one third of the width of the key 10. Note, however, that the invention is no limited to a key of the above described relative dimensions. For example, a slot 18 which is 1/10 of the key width and ⅛ of the key length may be optimum in some applications.

The stress concentration factors for a key 10 as dimensioned according to the preceding paragraph are graphically compared to the stress concentration factors for a standard key in FIG. 5. The comparison is for a shaft having a larger diameter $d_1$ and a smaller diameter $d_2$ which is one half of $d_1$. The hub is mounted on the smaller diameter of the shaft and is spaced a distance "a" from the shoulder of the shaft. For the key joints graphically depicted, the length L of the improved key 10 is about equal to the width X of the hub and the length of the standard key is about one half of the width X of the hub. In both joints, the keys are axially centered within the hub. Under these conditions, the maximum stress or $W_{max}$ will occur at a distance of "a" plus X/4 from the shoulder which corresponds to the left end of the standard key and to approximately the left end of the central portion 11 of the improved key 10.

FIG. 5 shows that the key 10 greatly reduces the stress concentration attributable to standard keys for essentially all values of a/X. As shown, the reduction is most dramatic for small values of a/X. This means that, assuming all other variables remain constant, the improvement provided by the invention is most pronounced near the shoulder. Thus, the joint of FIGS. 3 and 4 is shown with the hub assembled immediately adjacent to the shoulder and the inside end of the hub bore is chamfered to provide clearance for the fillet at the junction between the small diameter and the large diameter of the shaft.

The results depicted in FIG. 5 are understandable in the following terms. A shaft or hub in torsion undergoes an angular deformation, commonly known as strain. If axial lines were drawn on the shaft in its free state and it was then subjected to a torsional load, it would begin to take on the appearance of a barber pole. The further that one were to follow the helical lines through an axial distance, the further one would become circumferentially displaced from the starting point. Since the hub 27 deforms less than the shaft 26 because of factors such as the way it is loaded and its greater moment of inertia, a key coupling the shaft to the hub can be viewed as tending to straighten out the helical lines of the shaft so as to reorient them closer to an axial direction. Since the shaft is stiffer closer to the shoulder, if offers more resistance to being reoriented by the key and therefore stress concentrations are higher near the shoulder. Stress concentration is also dependent upon the length of the key because the longer the key is, the larger the circumferential displacement is that the shaft is forced to conform to.

In a standard key, the relatively large torsional strain of the shaft abruptly meets the relatively small torsional strain of the hub at the end of the key and the shaft is suddenly made to conform to the hub. The relatively flexible end portions 17 of a key 10 of the invention, on the other hand, ease the transition from the strain of the shaft to the strain of the hub from the end of the key to the central portion. Furthermore, the invention does it at a relatively low cost.

One other advantage of a key of the invention is that it helps compensate for errors in the assembly of the key joint. A key joint may have many defects which can compound stress concentrations. For example, the hub keyway may be formed so that it is skewed relative to the shaft keyway in the assembled joint. This causes pressure points, usually at the end of the key 10, when a standard key is used to couple the keyways. Since the ends of such keys are as rigid as the interior portions, the forces transmitted by the key are concentrated in a small area to aggravate the stress concentrations which are associated with key joints even when they are properly assembled. Other defects such as inclusions, finish imperfections, or excessive clearances can also cause pressure points. Since the ends of the key 10 are relatively elastic, they can deflect to compensate for defects in the joint to spread otherwise concentrated forces over a larger area. With respect to keys having arcuate ends, the invention provides the added advantages that the forces are spread over a larger surface due to its flat sides than the line contact in such arcuately ended keys.

I claim:

1. A key for a coupling to transmit a torque between a shaft and a hub, comprising:
   a central portion; and
   a pair of end portions, each end portion being at an end of the central portion and being coterminus therewith and having a pair of spaced-apart longitudinal prongs, the inside surface of each prong being substantially parallel to the inside surface of the other prong and both inside surfaces being substantially planar; and
   wherein said key is suitable to be disposed in said coupling with the inside surfaces of the prongs extending through the key from the shaft to the hub in a generally radial direction.

2. The key of claim 1, wherein the prongs are of the same thickness.

3. The key of claim 2, wherein the inside surfaces of the prongs are joined at their inside ends near the central portion by a radius.

4. In a key for a coupling to transmit a torque between a shaft and a hub, said key having top, bottom, left side, right side and end surfaces which generally form a rectangular parallelepiped which is longer than it is wide or high, the improvement wherein:
   the key has a central portion and a pair of end portions, each end portion being coterminus with an end of the central portion and having a slot formed therein which extends through the key from top to bottom, each slot opening at the outer end of the end portion and the sides of the slot being straight and extending toward the central portion and terminating adjacent to the central portion so that the end portions of the keys are less rigid than the central portion; and
   the key is suitable to be assembled in the coupling with the bottom adjacent to one of said shaft and hub and the top adjacent to the other, with the slots extending through the key in a substantially radial direction.

5. The key of claim 4, wherein each slot is centered between the left and right sides of the key.

6. The key of claim 5, wherein the slot terminates adjacent to the central portion in a radius.

7. A key joint for transmitting a torque, comprising:
   a cylindrical shaft with a keyway formed therein;
   a hub having a cylindrical bore therethrough for mounting the hub on the shaft and having a keyway formed therein which is substantially aligned with the keyway formed in the shaft; and
   a key having substantially planar top, bottom, left side, right side and end surfaces which are generally perpendicular to the adjacent surfaces so that the outside surfaces of the key generally define a parallelepiped, the key comprising:
   a central portion; and
   a pair of end portions, each end portion being coterminus with an end of the central portion and having a slot formed therein which extends through the key from top to bottom, each slot opening at the outer end of the end portion and the sides of the slot being straight and extending toward the central portion and terminating adjacent to the central portion so that the end portions of the key are less rigid than the central portion; and
   wherein the key is disposed in the keyways formed by the shaft and hub with the slots extending between the shaft and hub in a generally radial direction.

8. The key joint of claim 7, wherein the slot terminates adjacent to the central portion in a radius.

* * * * *